United States Patent
Mei et al.

(10) Patent No.: US 11,185,192 B2
(45) Date of Patent: Nov. 30, 2021

(54) COOKING APPLIANCE

(71) Applicant: FOSHAN SHUNDE MIDEA ELECTRICAL HEATING APPLIANCES MANUFACTURING CO., LIMITED, Foshan (CN)

(72) Inventors: Ruoyu Mei, Foshan (CN); Weijie Chen, Foshan (CN); Pofeng Ho, Foshan (CN); Dianguo Pan, Foshan (CN); Xiaokai Liu, Foshan (CN); Ya Zhou, Foshan (CN)

( * ) Notice: Subject to any disclaimer, the term of this patent is extended or adjusted under 35 U.S.C. 154(b) by 352 days.

(21) Appl. No.: 16/343,761

(22) PCT Filed: Aug. 24, 2017

(86) PCT No.: PCT/CN2017/098870
§ 371 (c)(1),
(2) Date: Apr. 20, 2019

(87) PCT Pub. No.: WO2018/072554
PCT Pub. Date: Apr. 26, 2018

(65) Prior Publication Data
US 2019/0246844 A1    Aug. 15, 2019

(30) Foreign Application Priority Data
Oct. 20, 2016 (CN) .......................... 201610917222.9

(51) Int. Cl.
*A47J 43/24* (2006.01)
*A47J 36/00* (2006.01)

(52) U.S. Cl.
CPC ............... *A47J 43/24* (2013.01); *A47J 36/00* (2013.01)

(58) Field of Classification Search
CPC ......... A47J 27/004; A47J 36/00; A47J 36/32; A47J 43/24
(Continued)

(56) References Cited

FOREIGN PATENT DOCUMENTS

| CN | 204260526 U | 4/2015 |
| CN | 205125896 U | 4/2016 |

(Continued)

OTHER PUBLICATIONS

OA1 of JP Application No. 2019-520808.
International Search Report dated Nov. 27, 2017 in the corresponding application (application No. PCT/CN2017/098870).

*Primary Examiner* — Dana Ross
*Assistant Examiner* — Joseph W Iskra
(74) *Attorney, Agent, or Firm* — Kilpatrick Townsend & Stockton, LLP

(57) ABSTRACT

The present disclosure provides a cooking appliance, comprises a cooking system and a transport control system. The cooking system comprises a cleaning device, a cooking cavity connected to the cleaning device, and a first control device. The cleaning device is provided with a first input port and a second input port; the first control device can independently control the cooking system; the transport control system is located on the outer side of the cooking system and is detachably connected to the cooking system; and the transport control system can be communicated with the first input port and the second input port to transport a foodstuff to be cleaned and water for cleaning the foodstuff to the cleaning device by means of the first input port and the second input port, respectively.

10 Claims, 3 Drawing Sheets

(58) Field of Classification Search
USPC .......................................................... 99/334
See application file for complete search history.

(56) References Cited

FOREIGN PATENT DOCUMENTS

| | | | |
|---|---|---|---|
| CN | 206252301 U | | 6/2017 |
| JP | H09201279 A | | 8/1997 |
| JP | 2002224578 | * | 8/2002 |
| JP | 2002224578 A | | 8/2002 |
| JP | 2003210316 A | | 7/2003 |
| JP | 2007050368 A | | 3/2007 |
| JP | 2012080891 A | | 4/2012 |
| KR | 20050038403 A | | 4/2005 |
| KR | 20090007080 A | | 1/2009 |
| WO | 2007032607 A1 | | 3/2007 |
| WO | 2016024237 A3 | | 2/2016 |
| WO | WO2016024237 | * | 2/2016 |

* cited by examiner

COOKING APPLIANCE

RELATED APPLICATIONS

This application is a national phase application of International Application No. PCT/CN2017/098870, filed Aug. 24, 2017, which claims priority to Chinese Patent Application No. 201610917222.9, filed with the Chinese Patent Office on Oct. 20, 2016, and entitled "COOKING APPLIANCE", which is incorporated herein by reference in their entirety.

TECHNICAL FIELD

The present disclosure relates to the field of kitchen utensils, and in particular, to a cooking appliance.

BACKGROUND

At present, intelligent cooking appliances such as automatic rice cookers have a complicated structure and a large body, and the water supply equipment and the feeding equipment are mixed with a cooking system. Thus, the structures of a power control system, a panel operating system and the like of the cooking system are affected by water. This results in the reduced reliability of the whole machine, the increased probability of product failure, and the tremendous workload of maintenance.

SUMMARY

The present disclosure aims to provide a cooking appliance in order to solve at least one of the technical problems in the prior art or the related art.

In view of these, the present disclosure provides a cooking appliance, which comprises: a cooking system including a cleaning device, a cooking cavity connected to the cleaning device, and a first control device, the cleaning device being provided with a first input port and a second input port, the first control device can independently control the cooking system; and a transport control system being located on the outer side of the cooking system and detachably connected to the cooking system, the transport control system can be communicated with the first input port and the second input port to transport a foodstuff to be cleaned and water for cleaning the foodstuff to the cleaning device by means of the first input port and the second input port, respectively.

By separating the cooking system from the transport control system and implementing the connection between the two systems by means of pipelines or other approaches, the cooking appliance provided by the present disclosure ensures that the cooking system and the transport control system can operate independently without interfering with each other, thereby effectively improving the reliability of the whole cooking appliance and reducing the fault probability of the product.

Specifically, the cooking appliance comprises the cooking system and the transport control system, and the cooking system comprises the first control device and thus is capable of operating independently without be affected by the transport control system. The transport control system is located on the outer side of the cooking system and detachably connected to the cooking system for supplying water and foodstuff to the cooking system, so that the feeding device and the water supply device of the cooking appliance of the present application are separated from the cooking system, thereby solving the problem in the prior art that the feeding device and the water supply device are mixed with the cooking system, and thus, the power control system, the operation panel and the like of the cooking system are affected by water, resulting in reduced reliability. This also effectively improves the reliability of the whole cooking appliance and reduces the failure probability of the product, thereby significantly reducing the maintenance workload of the product and increasing the market competitiveness of the product. In addition, since the transport control system is located on the outer side of the cooking system and is detachably connected to the cooking system, when the transport control system or the cooking system is in trouble, only the transport control system or the cooking system can be replaced without causing the whole cooking appliance to be scrapped, which also reduces the cost of the product.

In addition, the cooking appliance in the above embodiments provided by the present disclosure further has the following additional technical features.

In one embodiment, the transport control system comprises: a feeding device including a feeding assembly and a feeding pipe, wherein an inlet of the feeding pipe is connected to the feeding assembly, and an outlet of the feeding pipe can be communicated with the first input port to transport the foodstuff to be cleaned to the cleaning device; a waterway conveying device including a water feeding assembly and a water supply pipe, wherein an inlet of the water supply pipe is connected to the water feeding assembly, and the outlet of the water supply pipe can be communicated with the second input port to transport water for cleaning the foodstuff to the cleaning device; and a second control device being connected to the feeding device and the waterway conveying device to control on and off of the feeding device and the waterway conveying device.

The transport control system comprises the feeding device, the waterway conveying device and the second control device. The feeding device communicates with the first input port through the feeding pipe, and uses the wind power or other power to transport the foodstuff to be cleaned to the cleaning device, thereby realizing the feeding function of the transport control system. The waterway conveying device is communicated with the second input port through the water supply pipe, and supplies water for cleaning the foodstuff to the cleaning device, realizing the water supply function of the transport control system. The second control device is connected to the feeding device and the waterway conveying device, and control the start and stop of the feeding action and the start and stop of the water supply action respectively by separately controlling on and off of the two devices, realizing the automatic control function of the transport control system, so that it can operate independently without interference from the cooking system. The feeding device, the waterway conveying device and the second control device cooperates, realizing the automatic feeding and automatic water supply of the cooking appliance, ensuring that the cooking appliance can automatically clean the foodstuff, and realizing the fully automatic function of the cooking appliance.

In one embodiment, the feeding assembly comprises: a storage bin for storing the foodstuff, the storage bin being provided with a discharge port; a discharge pipe, an inlet of which is communicated with the discharge port, and an outlet of which is communicated with the inlet of the feeding pipe; an air supply component, an air supply port of which is communicated with the inlet of the feeding pipe, for blowing air into the feeding pipe, to feed the foodstuff in the feeding pipe into the cleaning device; and a first control component disposed on the discharge pipe and connected to the second control device, for controlling on and off of the discharge pipe.

The feeding assembly comprises the storage bin, the discharge pipe, the air supply component and the first control component. The feeding device is a pneumatic feeding device that realizes feeding by using wind, feeding efficiency of which is high and which is clean and pollution-free. Moreover, the air stirring of the foodstuff can also be realized and the foodstuff can be cleaned more effectively. Specifically, when feeding, the second control device controls the first control component to conduct the discharge pipe, and the foodstuff in the storage bin enters the feeding pipe through the discharge pipe and enters the cleaning device through the first input port under the blowing of the air supply component. Thus, the feeding function of the feeding device is realized. When the feeding is completed, the second control device controls the first control component to cut off the discharging pipe, and the feeding device stops feeding, but the air supply component can still supply air to the feeding pipe, so that the air enters the cleaning device, the movement of the foodstuff and water is promoted, and the two are agitated, thereby enabling air agitation of the foodstuff and more effectively cleaning the foodstuff.

In one embodiment, the feeding assembly further comprises: a sensor weighing device being connected to the storage bin and being capable of weighing the total weight of the storage bin and the foodstuff in the storage bin.

By providing the sensor weighing device to weigh the total weight of the storage bin and the foodstuff in the storage bin, the weight of the foodstuff output in the storage bin, that is, the weight of the foodstuff delivered to the cleaning device, can be obtained by means of the weight change displayed by the sensor weighing device. In turn, precise dosing feeding of the feeding device is realized.

In one embodiment, the feeding pipe is a hose.

In one embodiment, the storage bin is funnel shaped.

In one embodiment, the air supply component is a cyclone motor.

In one embodiment, the first control component is an electromagnetic ball valve.

The storage bin is funnel-shaped, which is convenient for the foodstuff to be automatically discharged under the action of gravity. Of course, the shape of the storage bin is not limited to the funnel shape. The feeding pipe is a hose, the hose has the better flexibility, and the requirement of installation space is relatively low, thereby realizing the simple, effective and flexible material transport, and causing the space arrangement to be more flexible and saving space. The air supply component is a cyclone motor, whose wind is large and use reliability is high. Of course, other air supply components can also be used. The first control component is an electromagnetic ball valve, which can be reliably controlled and has high sensitivity. Of course, the first control component can also be other control component.

In one embodiment, the discharge pipe, the feeding pipe and the air supply component are in communication through a relay component, which has three interfaces, the three interfaces being communicated with the outlet of the discharge pipe, the inlet of the feeding pipe, and the air supply port of the air supply component, respectively.

The discharge pipe, the feeding pipe and the air supply component are connected by the relay component having three interfaces, and the foodstuff in the discharge pipe first enters the relay component, and then is blown into the feeding pipe by the air supply component, and enters the cleaning device through the feeding pipe. This layout is very reasonable, ensuring that the foodstuff can only flow towards the direction of the cleaning device rather than the opposite direction, thus ensuring the reliability of using the product.

In one embodiment, the relay component is a three-way pipe or a container having the three interfaces.

The relay component is a three-way pipe, and the connection of the three-way pipe is reliable, its price is low, and its installation is convenient. The relay component is a container including three interfaces, such as a container shaped like a three-necked flask, and thus, also plays a certain transition role, so that the foodstuff can stay in the relay component and tumble and rub under the action of the wind, and some particles on the surface of the foodstuff fall off, thereby playing a certain dry cleaning effect and improving the cleanliness of the foodstuff. Of course, the relay component can also be other components as long as it has three interfaces and can realize an effective connection between the discharge pipe, the feeding pipe and the air supply component.

In one embodiment, the water feeding assembly includes: a water supply assembly connected to the inlet of the water supply pipe, for supplying water to the water supply pipe; and a second control component disposed on the water supply pipe and connected to the second control device, for controlling on and off of the water supply pipe.

The water feeding assembly includes the water supply component and the second control component. When the water is supplied, the second control device controls the second control component to conduct the water supply pipe, and the water supply component feeds the water into the cleaning device through the water supply pipe to realize the water feeding function of the waterway conveying device. When feeding of the water is completed, the second control device controls the second control component to cut off the water supply pipe, and the foodstuff and the water in the cleaning device are mixed with each other to realize cleaning of the foodstuff. After the cleaning device completes the cleaning action, the water supply pipe can be conducted again, water is again supplied to the cleaning device to effectively clean the cleaning device itself.

In one embodiment, the water feeding assembly further includes a flow meter disposed on the water supply pipe for detecting the amount of water passing through the water supply pipe.

The flow meter is arranged on the water supply pipe, and the flow amount through the water supply pipe is detected by the flow meter, and the amount of water feed into the cleaning device by the waterway conveying device can be obtained, thereby realizing accurate quantitative water supply.

In one embodiment, the water supply assembly includes a water pipe joint that is connectable to an external water source to deliver external water to the transport control system.

In one embodiment, the water supply assembly further includes a third control component, which is disposed on the water pipe joint for controlling on and off of the water pipe joint.

The water supply component includes a water pipe joint, and water in the external water source is directly conveyed to the cleaning device by the water pipe joint, such as directly connecting with the tap water pipe, which is very convenient, and does not need to provide a separate water storage structure, thereby further simplifying the structure of the cooking appliance, and making the structure of the whole cooking appliance more compact and take up less space.

Further, a third control component is arranged on the water pipe joint to control on and off of the water pipe joint, and avoid the water backflow in the water supply pipe, thereby further improving the reliability of using the product.

In one embodiment, the water supply assembly includes a water tank being capable of storing water for cleaning the foodstuff, and a water outlet of the water tank is in communication with an inlet of the water supply pipe.

In one embodiment, the water supply assembly further includes a water pump, the input end of which being communicated with the water outlet of the water tank, and the output end of which being communicated with the transport control system, for pumping water in the water tank into the transport control system.

The water supply assembly includes a water tank, and water can also conveniently supplied to the cleaning device by the water tank storing water. Further, by setting the water pump, it is ensured that the water in the water tank can be pumped into the cleaning device, thereby ensuring the reliability of using the product.

In one embodiment, the water supply pipe is a hose.

In one embodiment, the second control component is a solenoid valve.

The water supply pipe is a hose, the hose is flexible and easy to deform, and the requirement of installation space is relatively low, thereby realizing simple, effective and flexible water conveying, making the space arrangement more flexible and save space. The second control component is an electromagnetic valve, control of which is reliable and sensitivity of which is high. Of course, it can be other control component.

In one embodiment, the transport control system is disposed on one side of the cooking system such that the cooking appliance has a horizontal configuration.

By disposing the transport control system on one side of the cooking system, the cooking appliance as a whole has a horizontal structure, thereby avoiding the vertical structure in the prior art, simplifying the structure and the control principle of the product on the basis of ensuring full automation of the product, making the whole cooking appliance compact, and reducing the occupation of space. In one embodiment, the transport control system is disposed on the left or right side of the cooking system. In one embodiment, the transport control system is disposed on the front or rear side of the cooking system.

In one embodiment, the cooking appliance is a rice cooker.

Of course, the cooking appliance is not limited to rice cooker, but may also be electric pressure cookers or other cooking utensils.

Additional aspects and advantages of the present disclosure will be more apparent in the description below, or may be learned by the practice of the present disclosure.

BRIEF DESCRIPTION OF THE DRAWINGS

The foregoing and/or additional aspects and advantages of the present disclosure will become apparent and understandable from the following description of the embodiments in conjunction with the accompanying drawings, wherein.

Figure 1:
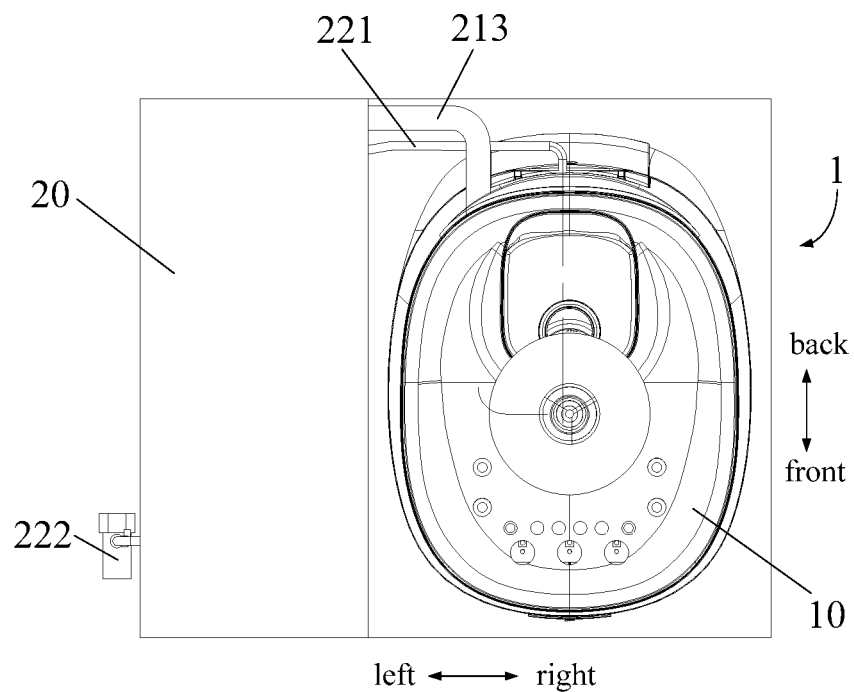
FIG. 1 is a top view showing a structure of a cooking appliance according to a first embodiment of the present disclosure.

Wherein, the correspondence between the reference numerals in FIG. 1 to FIG. 6 and the part names is:

1 rice cooker, 10 cooking system, 11 cleaning device, 20 transport control system, 211 storage bin, 212 discharge pipe, 213 feeding pipe, 214 cyclone motor, 215 electromagnetic ball valve, 216 sensor weighing device, 217 three-way pipe, 221 water supply pipe, 222 water pipe joint, 223 electromagnetic valve, 224 flow meter, 23 second control device.

DETAILED DESCRIPTION OF THE EMBODIMENTS

Accordingly to embodiments of the present disclosure, a further detailed description of the present disclosure will be given below in combination with the accompanying drawings and embodiments. It should be noted that, in the absence of a conflict, the embodiments of the present application and the features in the embodiments can be combined with each other.

A lot of specific details are set forth in the following description so as to fully understand the present disclosure, but the present disclosure may also be implemented in other ways other than those described herein, and thus the protection scope of the present disclosure is not limited to the specific embodiments disclosed below.

A cooking appliance in accordance with some embodiments of the present disclosure is described below with reference to FIGS. 1-6.

As shown in FIGS. 1 to 6, the present disclosure provides a cooking appliance which comprises a cooking system 10 and a transport control system.

Specifically, the cooking system 10 includes a cleaning device 11, a cooking cavity connected to the cleaning device 11, and a first control device, and the cleaning device 11 is provided with a first input port and a second input port. The first control device is capable of independently controlling the cooking system 10. The transport control system 20 is located on the outer side of the cooking system 10 and detachably connected to the cooking system 10, and the transport control system 20 can be communicated with the first input port and the second input port to transport a foodstuff to be cleaned and water for cleaning the foodstuff to the cleaning device 11 by means of the first input port and the second input port, respectively.

By separating the cooking system 10 from the transport control system 20 and implementing the connection between the two systems by means of pipelines or other approaches, the cooking appliance provided by the present disclosure ensures that the cooking system 10 and the transport control system 20 can operate independently without interfering with each other, thereby effectively improving the reliability of the whole cooking appliance and reducing the fault probability of the product.

Specifically, the cooking appliance comprises the cooking system 10 and the transport control system 20. The cooking system 10 comprises the first control device and thus is capable of operating independently without be affected by the transport control system 20. The transport control system 20 is located on the outer side of the cooking system 10 and detachably connected to the cooking system 10 for supplying water and foodstuff to the cooking system, so that a feeding device and a water supply device of the cooking appliance of the present application are separated from the cooking system 10, thereby solving the problem in the prior art that the feeding device and the water supply device are mixed with the cooking system 10, and thus, the power control system, the operation panel and the like of the cooking system 10 are affected by water, resulting in reduced reliability. This also effectively improves the reliability of the whole cooking appliance and reduces the failure probability of the product, thereby significantly reducing the maintenance workload of the product and increasing the market competitiveness of the product. In addition, since the transport control system 20 is located on the outer side of the cooking system 10 and is detachably connected to the cooking system 10, when the transport control system 20 or the cooking system 10 is in trouble, only the transport control system 20 or the cooking system 10 can be replaced without causing the whole cooking appliance to be scrapped, which also reduces the cost of the product.

Figure 2:
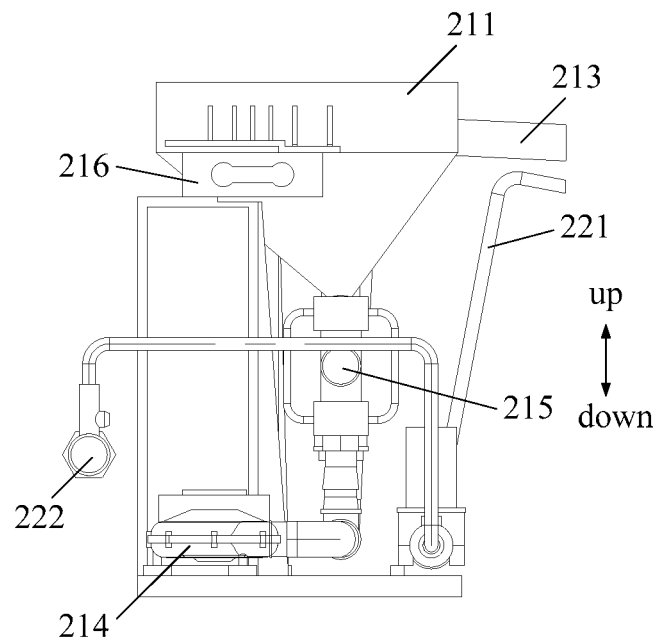
FIG. 2 is a schematic structural view of the transport control system in FIG. 1.
Figure 3:
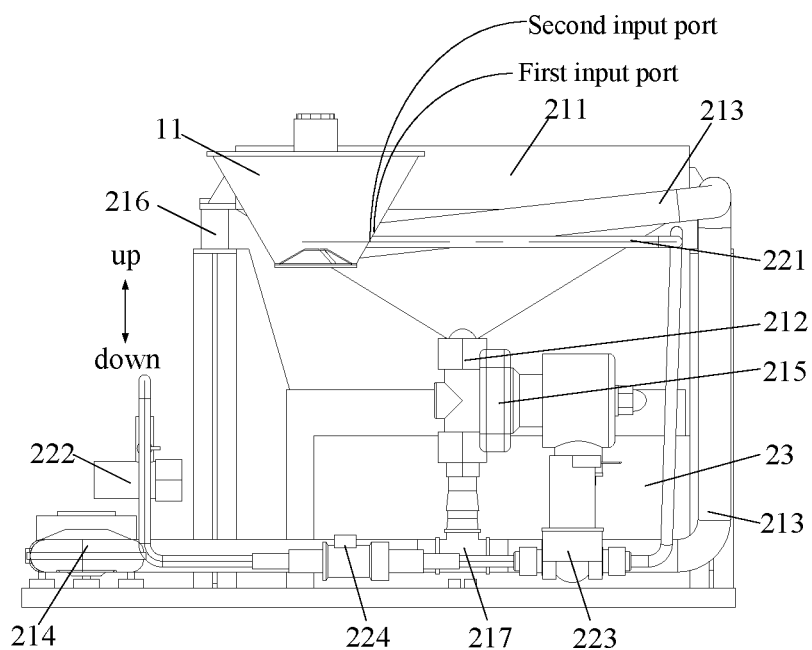
FIG. 3 is a right side schematic view of the structure (including the cleaning device) shown in FIG. 2.

In some embodiments of the present disclosure, as shown in FIG. 2 and FIG. 3, the transport control system 20 comprises a feeding device, a waterway conveying device and a second control device 23.

Specifically, the feeding device includes a feeding assembly and a feeding pipe 213, and an inlet of the feeding pipe 213 is connected to the feeding assembly and an outlet of the feeding pipe 213 can be communicated with the first input port to transport the foodstuff to be cleaned to the cleaning device 11. The waterway conveying device includes a water feeding assembly and a water supply pipe 221, and an inlet of the water supply pipe 221 is connected with the water feeding assembly, and the outlet of the water supply pipe 221 can be communicated with the second input port to transport water for cleaning the foodstuff to the cleaning device 11. The second control device 23 is connected to the feeding device and the waterway conveying device to control on and off the feeding device and the waterway conveying device.

The transport control system 20 comprises the feeding device, the waterway conveying device and the second control device 23. The feeding device communicates with the first input port through the feeding pipe 213, and uses the wind power or other power to transport the foodstuff to be cleaned to the cleaning device 11, thereby realizing the feeding function of the transport control system 20. The waterway conveying device is communicated with the second input port through the water supply pipe 221, and supplies water for cleaning the foodstuff to the cleaning device 11, realizing the water supply function of the transport control system 20. The second control device 23 is connected with the feeding device and the waterway conveying device, and control the start and stop of the feeding action and the start and stop of the water supply action respectively by separately controlling on and off of the two devices, realizing the automatic control function of the transport control system 20, so that it can operate independently without interference from the cooking system 10. The feeding device, the waterway conveying device and the second control device 23 cooperates to realize the automatic feeding and automatic water supply of the cooking appliance, ensuring that the cooking appliance can automatically clean the foodstuff, and realizing the fully automatic function of the cooking appliance.

Further, as shown in FIGS. 2 and 3, the feeding assembly comprises: a storage bin 211, a discharge pipe 212, an air supply component and a first control component. The storage bin 211 is used for storing the foodstuff, and the storage bin is provided with a discharge port. An inlet of the discharge pipe 212 is communicated with the discharge port, and an outlet of the discharge pipe 212 is communicated with the inlet of the feeding pipe 213. An air supply port of the air supply component is communicated with the inlet of the feeding pipe 213, for blowing air into the feeding pipe 213, to feed the foodstuff in the feeding pipe 213 into the cleaning device 11. The first control component is disposed on the discharge pipe 212 and is connected to the second control device 23, for controlling on and off of the discharge pipe 212.

In one embodiment, as shown in FIG. 2 and FIG. 3, the feeding assembly further comprises: a sensor weighing device 216 being connected to the storage bin 211 and being capable of weighing the total weight of the storage bin 211 and the foodstuff in the storage bin 211.

In one embodiment, the feeding pipe 213 is a hose.

In one embodiment, as shown in FIG. 2 and FIG. 3, the storage bin 211 is funnel shaped.

In one embodiment, the air supply component is a cyclone motor 214.

In one embodiment, the first control component is an electromagnetic ball valve 215.

In the above embodiments, the feeding assembly comprises the storage bin 211, the discharge pipe 212, the air supply component and the first control component. The feeding device is a pneumatic feeding device that realizes feeding by using wind, feeding efficiency of which is high and which is clean and pollution-free. Moreover, the air stirring of the foodstuff can also be realized and the foodstuff can be cleaned more effectively. Specifically, when feeding, the second control device 23 controls the first control component to conduct the discharge pipe 212, and the foodstuff in the storage bin 211 enters the feeding pipe 213 through the discharge pipe 212 and enters the cleaning device 11 through the first input port under the blowing of the air supply component. Thus, the feeding function of the feeding device is realized. When the feeding is completed, the second control device 23 controls the first control component to cut off the discharging pipe 212, and the feeding device stops feeding, but the air supply component can still supply air to the feeding pipe 213, so that the air enters the cleaning device 11, the movement of the foodstuff and water is promoted, and the two are agitated, thereby enabling air agitation of the foodstuff and more effectively cleaning the foodstuff.

By providing the sensor weighing device 216 to weigh the total weight of the storage bin 211 and the foodstuff in the storage bin 211, the weight of the foodstuff output in the storage bin 211, that is, the weight of the foodstuff delivered to the cleaning device 11, can be obtained by means of the weight change displayed by the sensor weighing device 216. In turn, precise dosing feeding of the feeding device is realized.

The storage bin 211 is funnel-shaped, which is convenient for the foodstuff to be automatically discharged under the action of gravity. Of course, the shape of the storage bin 211 is not limited to the funnel shape. The feeding pipe is a hose, the hose has the better flexibility, and the requirement of installation space is relatively low, thereby realizing the simple, effective and flexible material transport, and causing the space arrangement to be more flexible and saving space. The air supply component is a cyclone motor 214, whose wind is large and use reliability is high. Of course, other air supply components can also be used. The first control component is an electromagnetic ball valve 215, which can be reliably controlled and has high sensitivity. Of course, the first control component can also be other control component.

Further, as shown in FIG. 2 and FIG. 3, the discharge pipe 212, the feeding pipe 213 and the air supply component are in communication through a relay component, which has three interfaces, the three interfaces being communicated with the outlet of the discharge pipe 212, the inlet of the feeding pipe 213, and the air supply port of the air supply component, respectively.

In one embodiment, the relay component is a three-way pipe 217 or a container having the three interfaces.

In the above embodiments, the discharge pipe 212, the feeding pipe 213 and the air supply component are connected by the relay component having three interfaces, and the foodstuff in the discharge pipe 212 first enters the relay component, and then is blown into the feeding pipe 213 by the air supply component, and enters the cleaning device 11 through the feeding pipe 213. This layout is very reasonable, ensuring that the foodstuff can only flow towards the direction of the cleaning device 11 rather than the opposite direction, thus ensuring the reliability of using the product.

The relay component is the three-way pipe 217, and the connection of the three-way pipe 217 is reliable, its price is low, and its installation is convenient. The relay component is a container including three interfaces, such as a container shaped like a three-necked flask, and thus, also plays a certain transition role, so that the foodstuff can stay in the relay component and tumble and rub under the action of the wind, and some particles on the surface of the foodstuff fall off, thereby playing a certain dry cleaning effect and improving the cleanliness of the foodstuff. Of course, the relay component can also be other components as long as it has three interfaces and can realize an effective connection between the discharge pipe 212, the feeding pipe 213 and the air supply component.

Further, as shown in FIG. 2 and FIG. 3, the water feeding assembly includes: a water supply assembly and a second control component. The water supply assembly is connected to the inlet of the water supply pipe 221, for supplying water to the water supply pipe 221. The second control component is disposed on the water supply pipe 221 and connected to the second control device 23, for controlling on and off of the water supply pipe 221.

In one embodiment, as shown in FIG. 3, the water feeding assembly further includes a flow meter 224 disposed on the water supply pipe 221 for detecting the amount of water passing through the water supply pipe 221.

In one embodiment, the water supply pipe 221 is a hose.

In one embodiment, as shown in FIG. 2 and FIG. 3, the second control component is an electromagnetic valve 223.

In the above embodiments, the water feeding assembly includes a water supply assembly and a second control component. When the water is supplied, the second control device 23 controls the second control component t to conduct the water supply pipe 221, and the water supply component feeds the water into the cleaning device 11 through the water supply pipe 221 to realize the water feeding function of the waterway conveying device. When feeding of the water is completed, the second control device 23 controls the second control component to cut off the water supply pipe 221, and the foodstuff and the water in the cleaning device 11 are mixed with each other to realize cleaning of the foodstuff. After the cleaning device 11 completes the cleaning action, the water supply pipe 221 can be conducted again, water is again supplied to the cleaning device 11 to effectively clean the cleaning device 11 itself.

The flow meter 224 is arranged on the water supply pipe 221, and the flow amount through the water supply pipe 221 is detected by the flow meter 224, and the amount of water feed into the cleaning device 11 by the waterway conveying device can be obtained, thereby realizing accurate quantitative water supply.

The water supply pipe 221 is a hose, the hose is flexible and easy to deform, and the requirement of installation space is relatively low, thereby realizing simple, effective and flexible water conveying, making the space arrangement more flexible and save space. The second control component is a solenoid valve 223, control of which is reliable and sensitivity of which is high. Of course, it can be other control component.

In one embodiment, as shown in FIGS. 1 to 6, in one embodiment of the present disclosure, the water supply component includes a water pipe joint 222, which is connected to an external water source, in order to transport water in the external water source to the transport control system 20.

In one embodiment, the water supply assembly further includes a third control component, which is disposed on the water pipe joint 222 for controlling on and off of the water pipe joint.

In the embodiment, the water supply component includes the water pipe joint 222, and water in the external water source is directly conveyed to the cleaning device 11 by the water pipe joint 222, such as directly connecting with the tap water pipe, which is very convenient, and does not need to provide a separate water storage structure, thereby further simplifying the structure of the cooking appliance, and making the structure of the whole cooking appliance more compact and take up less space. Further, a third control component is arranged on the water pipe joint 222 to control on and off of the water pipe joint 222 and avoid the water backflow in the water supply pipe 221, thereby further improving the reliability of using the product.

In one embodiment, in another embodiment of the present disclosure (not shown in the figures), the water supply assembly includes a water tank being capable of storing water for cleaning the foodstuff, and a water outlet of the water tank is in communication with an inlet of the water supply pipe 221.

In one embodiment, the water supply assembly further includes a water pump, the input end of which being communicated with the water outlet of the water tank, and the output end of which being communicated with the transport control system 20, for pumping water in the water tank into the transport control system 20.

The water supply assembly includes a water tank, and water can also conveniently supplied to the cleaning device 11 by the water tank storing water. Further, by setting the water pump, it is ensured that the water in the water tank can be pumped into the cleaning device 11, thereby ensuring the reliability of using the product.

In any of the above embodiments, as shown in FIG. 1, FIG. 4, FIG. 5 and FIG. 6, the transport control system 20 is disposed on one side of the cooking system 10 such that the cooking appliance has a horizontal configuration.

Figure 4:
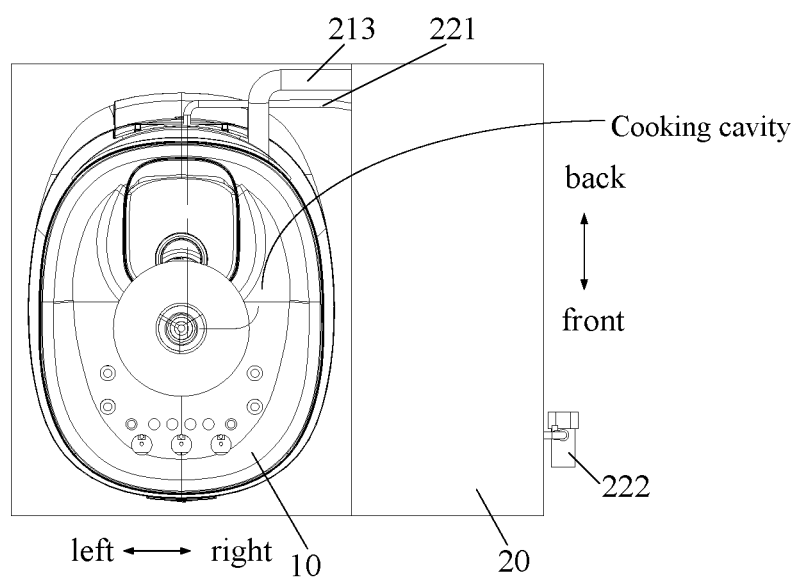
FIG. 4 is a top view showing a structure of a cooking appliance according to the second embodiment of the present disclosure.
Figure 5:
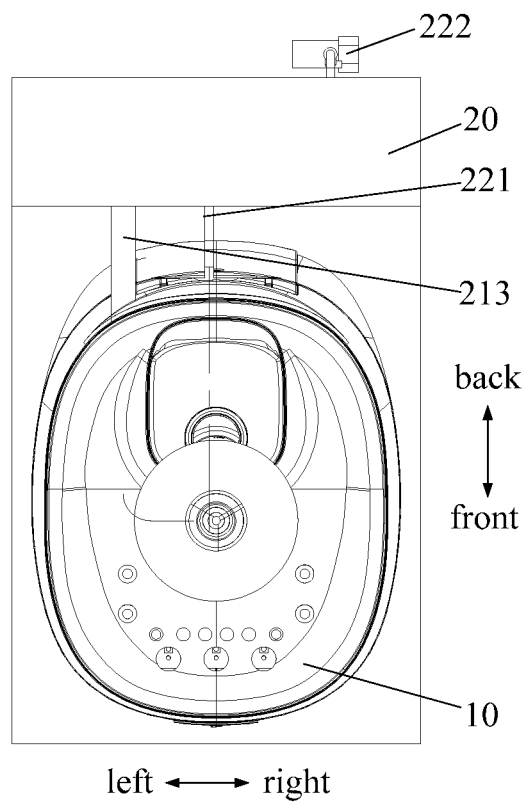
FIG. 5 is a top view showing a structure of a cooking apparatus according to a third embodiment of the present disclosure.
Figure 6:
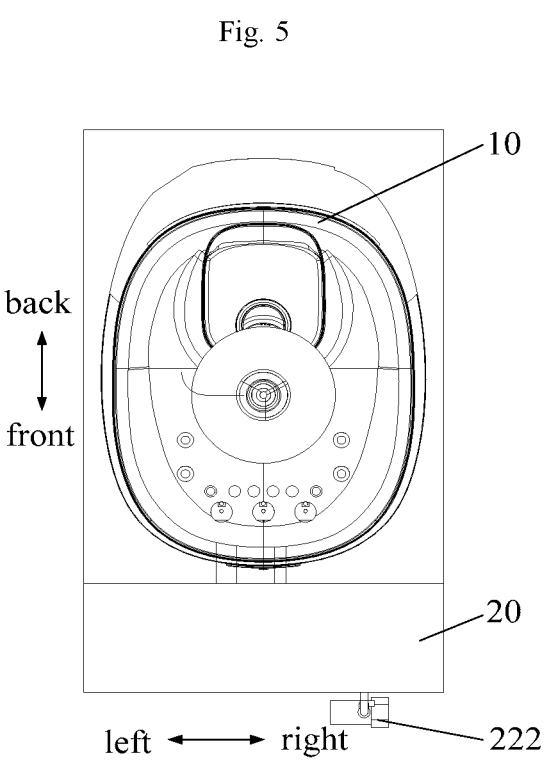
FIG. 6 is a top view showing a structure of a cooking apparatus according to a fourth embodiment of the present disclosure.

By disposing the transport control system 20 on one side of the cooking system 10, the cooking appliance as a whole has a horizontal structure, thereby avoiding the vertical structure in the prior art, simplifying the structure and the control principle of the product on the basis of ensuring full automation of the product, making the whole cooking appliance compact, and reducing the occupation of space. In one embodiment, the transport control system 20 is disposed on the left or right side of the cooking system 10, as shown in FIG. 1 and FIG. 4. Less in one embodiment, the transport control system 20 is disposed on the front or rear side of the cooking system 10, as shown in FIG. 5 and FIG. 6.

In any of the above embodiments, as shown in FIG. 1, FIG. 4, FIG. 5 and FIG. 6, the cooking appliance is a rice cooker 1. It can be further applied to the fields of soymilk machine, food processing industry, chemical industry, petroleum smelting industry, animal husbandry, agricultural automatic spraying, pharmaceutical industry and the like.

Of course, the cooking appliance is not limited to rice cooker 1, but may also be electric pressure cookers or other cooking utensils.

The operation principle of the cooking appliance provided by the present disclosure will be described in detail below with reference to a specific embodiment.

As shown in FIGS. 1 to 3, the cooking appliance is a rice cooker 1, the transport control system 20 is disposed on the left side of the cooking system 10, and its first input port and the second input port are provided at the rear of the washing device 11. Specifically, as shown in FIGS. 2 and 3, the transport control system 20 includes a feeding device, a waterway conveying device, and a second control device 23.

The feeding device comprises a feeding assembly and a feeding pipe 213, and the feeding assembly comprises a storage bin 211, a discharge pipe 212, an air supply component, a first control component and a sensor weighing device 216. The storage tank 211 has a funnel shape, the feeding pipe 213 is a hose, the air supply part is a cyclone motor 214, the first control component is an electromagnetic ball valve 215, and the feeding pipe 213, the discharging pipe 212 and the air supply component are connected through the three-way pipe 217.

The waterway conveying device includes a water feeding assembly and a water supply pipe 221. The water feeding assembly includes a water supply assembly, a second control component, and a flow meter 224. The water supply assembly includes a water pipe joint 222, and the water pipe joint 222 is connected to domestic tap water. The water supply pipe 221 is a hose, and the second control component is an electromagnetic valve 223.

The operation principle of the cooking appliance is as follows: when feeding, the electromagnetic ball valve 215 is opened, and the cyclone motor 214 operates. At this time, the waterway solenoid valve 223 is in a closed state, and the rice or other foodstuff in the funnel is feed to the cleaning device 11 of the cooking system 10, and in combination with the sensor weighing device 216, the quantitative feeding is realized. When the feeding action is completed, the electromagnetic ball valve 215 and the cyclone motor 214 are turned off, the waterway solenoid valve 223 is opened, water is feed to the cleaning device 11 of the cooking system 10, and the flow meter 224 simultaneously meters the amount of water. When the amount of water reaches a limited amount of the container, the water path solenoid valve 223 is closed to realize the quantitative water feeding. When the cleaning device 11 performs the cleaning operation, the cyclone motor 214 can be turned on, and air can be continuously blown into the cleaning device 11 by the cyclone motor 214 to accelerate the movement of the foodstuff and water in the cleaning device 11 and achieve air agitation. When the cleaning device 11 completes the cleaning operation and the foodstuff after cleaning is transferred out. Then, the water path electromagnetic valve 223 is opened again to clean the cleaning device 11 and keep the cleaning device 11 clean.

Therefore, the embodiment realizes automatic cleaning and feeding by combining pneumatic feeding with waterway control, and makes the whole cooking appliance compact and reduces space occupation while realizing full automation. Specifically, two functions are realized by the feeding device: simple and effective, flexible material transporting, making the space arrangement more flexible and saves space; and realizing air agitation while cleaning rice and other ingredients, and effectively cleaning the foodstuff. By the cooperation of the flow meter 224 and the solenoid valve 223, two functions are also realized: precisely control of the amount of water and cleaning of the cleaning device 11. By the cooperation of the sensor weighting device and the electromagnetic ball valve 215, accurate quantitative control of the rice is realized, and the cleaning device 11 realizes the cleaning function by pneumatic feeding and water quantity control.

In summary, by separating the cooking system from the transport control system and implementing the connection between the two systems by means of pipelines or other approaches, the cooking appliance provided by the present disclosure ensures that the cooking system and the transport control system can operate independently without interfering with each other, thereby effectively improving the reliability of the whole cooking appliance and reducing the fault probability of the product. Specifically, the cooking appliance comprises the cooking system and the transport control system, and the cooking system comprises the first control device and thus is capable of operating independently without be affected by the transport control system. The transport control system is located on the outer side of the cooking system and detachably connected to the cooking system for supplying water and foodstuff to the cooking system, so that the feeding device and the water supply device of the cooking appliance of the present application are separated from the cooking system, thereby solving the problem in the prior art that the feeding device and the water supply device are mixed with the cooking system, and thus, the power control system, the operation panel and the like of the cooking system are affected by water, resulting in reduced reliability. This also effectively improves the reliability of the whole cooking appliance and reduces the failure probability of the product, thereby significantly reducing the maintenance workload of the product and increasing the market competitiveness of the product. In addition, since the transport control system is located on the outer side of the cooking system and is detachably connected to the cooking system, when the transport control system or the cooking system is in trouble, only the transport control system or the cooking system can be replaced without causing the whole cooking appliance to be scrapped, which also reduces the cost of the product.

In the present disclosure, the terms "first" and "second" are used for the purpose of description only, and cannot be construed as indicating or implying relative importance; the term "plurality" means two or more unless otherwise clearly defined. The terms "installation", "connected", "connection", "fixing" and the like should be understood broadly. For example, the "connection" may be a fixed connection, a detachable connection, or an integral connection; the "connected" can be directly connected or indirectly connected through an intermediary medium.

In the description of the specification, it should be understood that the orientations or positional relationships indicated by the terms "upper", "lower", "front", "rear", "left", "right" and the like are orientations or positional relationships shown in the drawings, merely for facilitating to the description of the present disclosure and the simplification of the description. It is not intended to indicate or imply that the referred devices or units may have specific orientations, are constructed and operated in specific orientations, and therefore cannot be construed as limitation to the present disclosure.

In the description of the present specification, the description by the terms "one embodiment," "some embodiments," "specific embodiments" and the like means that a particular feature, structure, material or characteristic described in combination with the embodiment or example is included in at least one embodiment or example of the present disclosure. In the present specification, the schematic representation of the above terms does not necessarily refer to the same embodiment or example. Furthermore, the particular features, structures, materials or characteristics described may be combined in any suitable manner in any one or more embodiments or examples.

What is claimed is:

1. A cooking appliance, comprises:
    a cooking system including:
    a cleaning device, a cooking cavity connected to the cleaning device, and a first control device, the cleaning device being provided with a first input port and a second input port, the first control device is configured to independently control the cooking system; and
    a transport control system being located on a peripheral side of the cooking system and detachably connected to the cooking system, the transport control system is configured to communicate with the first input port and the second input port to transport a foodstuff to be cleaned and water for cleaning the foodstuff to the cleaning device by the first input port and the second input port, respectively;
    wherein the transport control system comprises a feeding device, the feeding device including a feeding assembly and a feeding pipe, wherein an inlet of the feeding pipe is connected to the feeding assembly, and an outlet of the feeding pipe is in communication with the first input port to transport the foodstuff to be cleaned to the cleaning device;
    wherein the feeding assembly comprises an air supply component, an air supply port of the air supply component being in communication with the inlet of the feeding pipe, the air supply component being configured to blow air into the feeding pipe to feed the foodstuff in the feeding pipe into the cleaning device;
    wherein when the feeding device stops feeding the foodstuff, the air supply component is configured to continue supplying air into the cleaning device to accelerate movement of the foodstuff and the water in the cleaning device.

2. The cooking appliance of claim 1, wherein the transport control system further comprises:
    a waterway conveying device including a water feeding assembly and a water supply pipe, wherein an inlet of the water supply pipe is connected to the water feeding assembly, and the outlet of the water supply pipe is in communication with the second input port to transport water for cleaning the foodstuff to the cleaning device; and
    a second control device being connected to the feeding device and the waterway conveying device to control on and off of the feeding device and the waterway conveying device.

3. The cooking appliance of claim 1, wherein the feeding assembly further comprises:
    a storage bin for storing the foodstuff, the storage bin being provided with a discharge port;
    a discharge pipe, an inlet in communication with the discharge port, and an outlet in communication with the inlet of the feeding pipe; and
    a first control component disposed on the discharge pipe and connected to the second control device configured to control on and off of the discharge pipe.

4. The cooking appliance of claim 3, wherein the feeding assembly further comprises:
    a sensor weighing module being connected to the storage bin and configured to weigh a total weight of the storage bin and the foodstuff in the storage bin.

5. The cooking appliance of claim 2, wherein the water feeding assembly includes:
    a water supply assembly connected to the inlet of the water supply pipe configured to supply water to the water supply pipe; and
    a second control component disposed on the water supply pipe and connected to the second control device configured to control on and off of the water supply pipe.

6. The cooking appliance of claim 5, wherein the water feeding assembly further includes:
    a flow meter disposed on the water supply pipe for detecting an amount of water passing through the water supply pipe.

7. The cooking appliance of claim 5, wherein
    the water supply assembly includes a water pipe joint configured to be connected to an external water source to deliver external water to the transport control system.

8. The cooking appliance of claim 5, wherein
    the water supply assembly includes a water tank configured to store water for cleaning the foodstuff, and a water outlet of the water tank is in communication with an inlet of the water supply pipe.

9. The cooking appliance of claim 1, wherein
    the transport control system is disposed on one side of the cooking system such that the cooking appliance has a horizontal configuration.

10. The cooking appliance of claim 1, wherein,
    the cooking appliance is a rice cooker.

* * * * *